US007128647B2

(12) United States Patent
Muir

(10) Patent No.: US 7,128,647 B2
(45) Date of Patent: Oct. 31, 2006

(54) METHODS AND APPARATUS FOR THREE-DIMENSIONAL GAMING

(75) Inventor: David Hugh Muir, Warnersbay (AU)

(73) Assignee: IGT, Reno, NV (US)

( * ) Notice: Subject to any disclaimer, the term of this patent is extended or adjusted under 35 U.S.C. 154(b) by 274 days.

(21) Appl. No.: 09/966,851

(22) Filed: Sep. 28, 2001

(65) Prior Publication Data

US 2003/0064781 A1 Apr. 3, 2003

(51) Int. Cl.
*A63F 13/00* (2006.01)

(52) U.S. Cl. ............................ 463/20; 463/16; 463/18; 463/19; 463/22; 463/30; 463/31; 463/32

(58) Field of Classification Search ............ 463/16–22, 463/30–32, 34; 273/138.1, 138.2, 139, 143 R, 273/292
See application file for complete search history.

(56) References Cited

U.S. PATENT DOCUMENTS

| | | | | |
|---|---|---|---|---|
| 5,152,529 | A * | 10/1992 | Okada | 463/20 |
| 5,395,111 | A * | 3/1995 | Inoue | 273/143 R |
| 5,752,881 | A * | 5/1998 | Inoue | 463/20 |
| 6,068,552 | A * | 5/2000 | Walker et al. | 463/21 |
| 6,086,066 | A * | 7/2000 | Takeuchi et al. | 273/143 R |
| 6,322,445 | B1 * | 11/2001 | Miller | 463/13 |
| 6,517,433 | B1 * | 2/2003 | Loose et al. | 463/20 |
| 6,520,856 | B1 * | 2/2003 | Walker et al. | 463/21 |
| 6,644,664 | B1 * | 11/2003 | Muir et al. | 273/146 |
| 7,040,987 | B1 * | 5/2006 | Walker et al. | 463/42 |
| 2004/0009803 | A1 * | 1/2004 | Bennett et al. | 463/16 |

FOREIGN PATENT DOCUMENTS

GB 2253300 A * 9/1992

OTHER PUBLICATIONS

Australian Patent Application PQ 9586.*

* cited by examiner

*Primary Examiner*—Xuan M. Thai
*Assistant Examiner*—Jeffrey C Panos
(74) *Attorney, Agent, or Firm*—Marshall, Gerstein & Borun LLP

(57) ABSTRACT

Methods and apparatus for three-dimensional gaming are disclosed. A three-dimensional casino game includes additional display layers, additional game options, and additional game evaluation methods over a traditional two-dimensional casino game. The three-dimensional casino game allows a player to select one or more three-dimensional game options such as how many layers to include in the game and which game positions are "staked." For example, in a video slot machine, the player may select three layers of reels and place a transparent stake indicator over the center reel position. The player's selections may determine one or more game evaluation methods and display modes. After one or more random numbers are generated, the outcome of the game is displayed three-dimensionally to the player based on the selected game evaluation methods and display modes. Many different game evaluation methods and payouts are possible in a three-dimensional casino game.

28 Claims, 23 Drawing Sheets

FIG. 20

2000

5 of a Kind (A) = 5000 credits
4 of a Kind (A) = 1000 credits
3 of a Kind (A) = 100 credits
2 of a Kind (A) = no prize
1 of a Kind (A) = no prize

FIG. 21

2100

| REEL STRIP LAYOUT | | | | | |
|---|---|---|---|---|---|
| *Pos.* | *1st Reel* | *2nd Reel* | *3rd Reel* | *4th Reel* | *5th Reel* |
| 1 | Q | E | Q | 10 | A |
| 2 | C | 10 | J | K | 10 |
| 3 | A | K | D | J | J |
| 4 | J | B | 10 | D | Q |
| 5 | D | 9 | Q | 9 | B |
| 6 | K | A | B | K | K |
| 7 | E | Z | 9 | 10 | 9 |
| 8 | 10 | Q | K | A | A |
| 9 | Z | K | J | J | 10 |
| 10 | 9 | D | E | Q | E |
| 11 | D | J | 10 | 9 | Q |
| 12 | K | E | Z | B | J |
| 13 | Q | 10 | 9 | Q | A |
| 14 | E | C | C | 10 | 9 |
| 15 | 10 | 9 | 10 | A | Z |
| 16 | A | E | K | J | Q |
| 17 | B | K | J | S | 10 |
| 18 | J | Z | D | 9 | K |
| 19 | S | D | 9 | K | 9 |
| 20 | 9 | Q | A | 10 | A |
| 21 | C | K | 10 | C | 10 |
| 22 | Q | E | B | J | J |
| 23 | Z | J | 9 | Z | K |
| 24 | 10 | C | A | 9 | 9 |
| 25 | A | 9 | J | Q | C |
| 26 | E | S | S | E | 10 |
| 27 | J | Q | Q | 10 | Q |
| 28 | K | D | 10 | J | 9 |
| 29 | D | J | C | 9 | A |
| 30 | 9 | A | Q | Q | J |
| 31 | | | J | | K |
| 32 | | | A | | 10 |
| 33 | | | 9 | | B |
| 34 | | | | | 9 |
| 35 | | | | | Q |
| 36 | | | | | S |

2102 2104 2102 2102 2104 2102 2104 2106 2104 2106

METHODS AND APPARATUS FOR THREE-DIMENSIONAL GAMING

BACKGROUND

To maintain or increase player interest in electronic casino games, game manufactures frequently introduce new games. Typically, new games employ new themes (e.g., a jungle themed video slot machine) and/or new player pay out options (e.g., threaded paylines on a video slot machine). New player pay out options are desirable because they give the player more control and flexibility over his gaming environment. In addition, an increased number of payout options increases the variety of odds available to a player. For example, increasing the number of symbols which much match on a video slot machine from three to five allows game designers to create decreased odds and increased payouts. However, current electronic casino games suffer from a lack of new game types, new display modes, and new win evaluation methods.

SUMMARY OF THE INVENTION

In accordance with a first aspect of the invention, a gaming apparatus is provided. The gaming apparatus comprises a display unit, a user input device, a value input device, and a controller. The controller is operatively coupled to the display unit, the user input device, and the value input device. The display unit is capable of generating video images. The controller may comprise a processor and a memory operatively coupled to the processor. The controller is programmed to allow a person to make a wager. The controller is further programmed to cause a video image to be generated on the display unit. The video image represents a casino game. In addition, the controller is programmed generate a display of a plurality of three dimensional game options and to receive at least one player selected three dimensional game option from the user input device. Still further, the controller is programmed to determine a three dimensional win evaluation method based on the player selected three dimensional game option. In addition, the controller is programmed to determine an outcome of the game represented by the video image and a value payout associated with said outcome of the game based on the three dimensional win evaluation method.

In one embodiment, the controller is programmed to modify a pay table and/or a reel strip layout based on the player selected three dimensional game option. In such an instance, the pay table and/or the reel strip layout may be changed without affecting an overall payout return associated with the gaming apparatus. In one embodiment, the controller is programmed to generate a transparent overlay on the display unit. The transparent overlay may be indicative of the three dimensional game option. The transparent overlay may be positioned on the display unit via the user input device by dragging a graphical selector across the video image. The graphical selector may transparently cover a single video slot machine reel position and/or an entire video slot machine reel. In one embodiment, the controller is programmed to generate a first video slot machine symbol within a second video slot machine symbol on the display unit.

The three dimensional win evaluation method may comprise at least one of combining a plurality of individual layer evaluations, an n-kind extension method, a "Z" layer interaction method, and an extended progressive win evaluation method. In one embodiment, the controller is programmed to determine the outcome of the game based on a number of play layers selected by a player via the user input device. In one embodiment, the controller is programmed to check the player selected three dimensional game option for allowability. Also, the controller may be programmed to check for the availability of sufficient credits based on the player selected three dimensional game option. In one embodiment, a plurality of gaming apparatus are interconnected by a network such as the Internet.

The video image may represent a game selected from the group of games consisting of video poker, video blackjack, video slots, video keno and video bingo. If the game comprises video poker, the video image may comprise an image of at least five playing cards. If the game comprises video slots, the video image may comprise an image of a plurality of simulated slot machine reels. If the game comprises video blackjack, the video image may comprise an image of a plurality of playing cards. If the game comprises video keno, the video image may comprise an image of a plurality of keno numbers. If the game comprises video bingo, the video image may comprise an image of a bingo grid.

In accordance with a second aspect of the invention, a gaming method is provided. The method includes the step of causing a video game image to be generated. The video game image may represent a game selected from the group of games consisting of video poker, video blackjack, video slots, video keno and video bingo. In addition, the video game image may represent a plurality of three dimensional game options. The method further includes the step of receiving at least one three dimensional game option. In addition, the method includes the steps of determining an outcome of said game represented by said video game image and determining a value payout associated with said outcome of said game based on said at least one three dimensional game option.

In accordance with a third aspect of the invention, a memory having a computer program stored therein is provided. The computer program may be capable of being used in connection with a gaming apparatus. The memory includes a first memory portion physically configured in accordance with computer program instructions that would cause the gaming apparatus to allow a person to make a wager. The memory also includes a second memory portion physically configured in accordance with computer program instructions that would cause the gaming apparatus to cause a video image to be generated on a display unit. The video image may represent a video slots game. The video image may include an image of a plurality of simulated slot machine reels. Each simulated slot machine reel comprises a plurality of slot machine symbols. The memory also includes a third memory portion physically configured in accordance with computer program instructions that would cause the gaming apparatus to display a plurality of three dimensional game options. The memory also includes a fourth memory portion physically configured in accordance with computer program instructions that would cause the gaming apparatus to determine at least one player selected three dimensional game option. The memory also includes a fifth memory portion physically configured in accordance with computer program instructions that would cause the gaming apparatus to determine an outcome of said game represented by said video image and a value payout associated with said outcome of said game. The payout may be determined based on said at least one player selected three dimensional game option.

The features and advantages of the present invention will be apparent to those of ordinary skill in the art in view of the detailed description of various embodiments, which is made with reference to the drawings, a brief description of which is provided below.

BRIEF DESCRIPTION OF THE DRAWINGS

FIG. 20 is an exemplary pay table that may be used by one or more of the gaming units for win evaluation processing;

FIG. 21 is an exemplary reel strip layout that may be used by one or more of the gaming units for win evaluation processing;

DETAILED DESCRIPTION OF THE VARIOUS EMBODIMENTS

Figure 1:
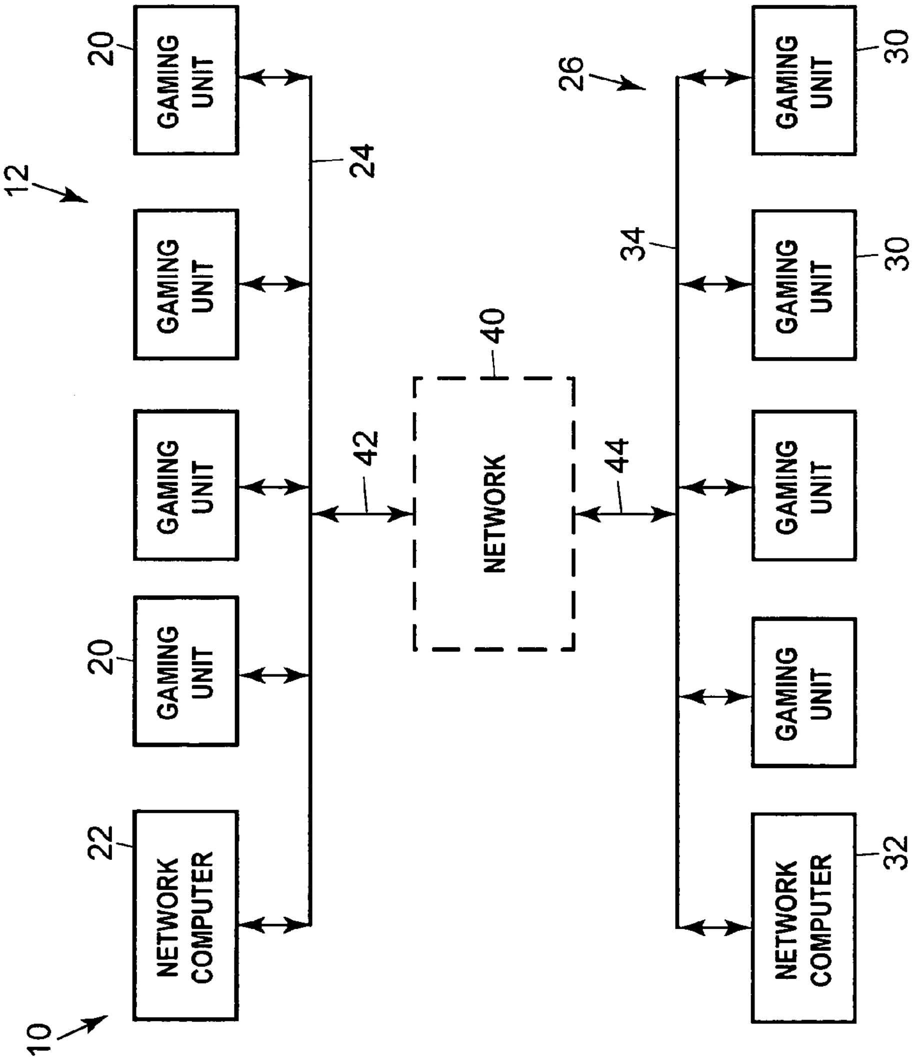
FIG. 1 is a block diagram of an embodiment of a gaming system in accordance with the invention.

FIG. 1 illustrates an embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link.

Although the data link 24 is shown as a single data link 24, the data link 24 may comprise multiple data links.

Figure 2:
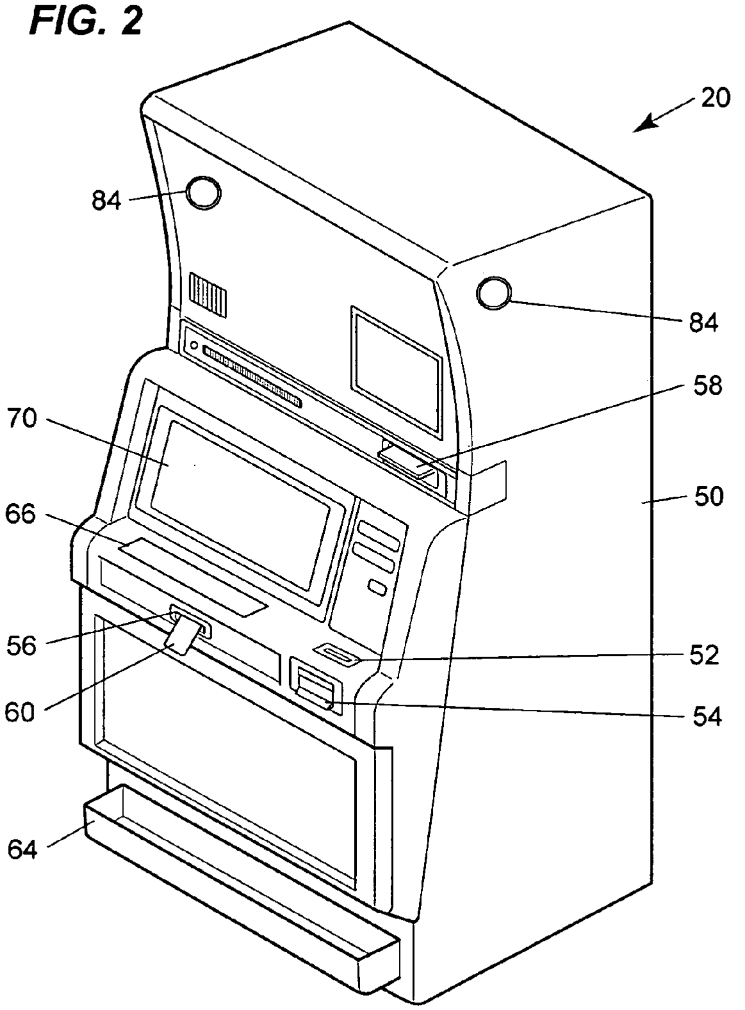
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
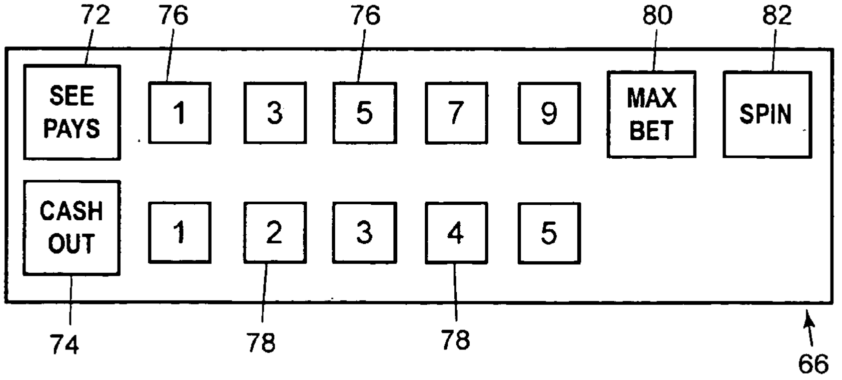
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
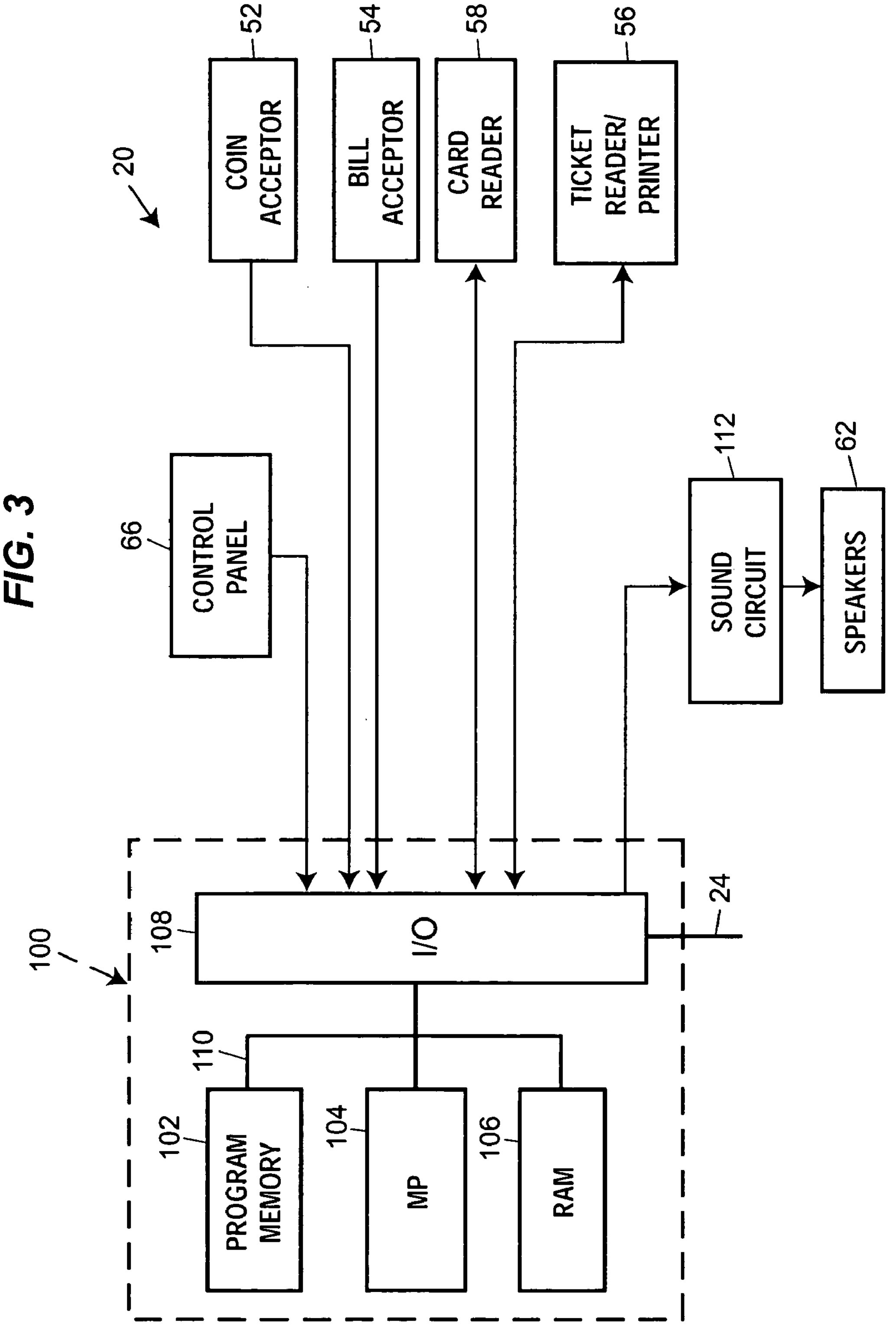
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 106 and program memories 102 may be implemented as semiconductor memories, magnetically readable memories, and/or optically readable memories, for example.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 4:
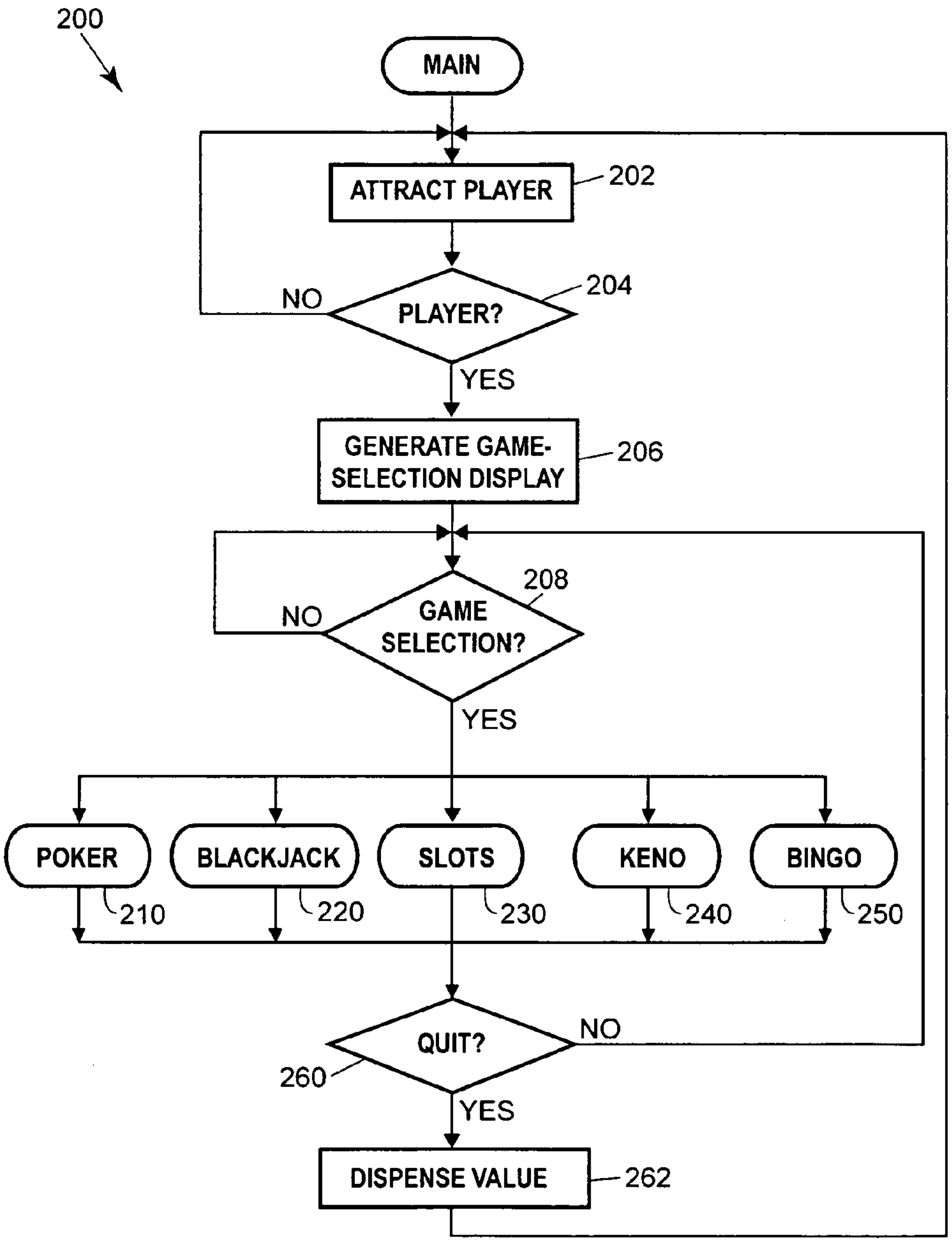
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player 5 deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
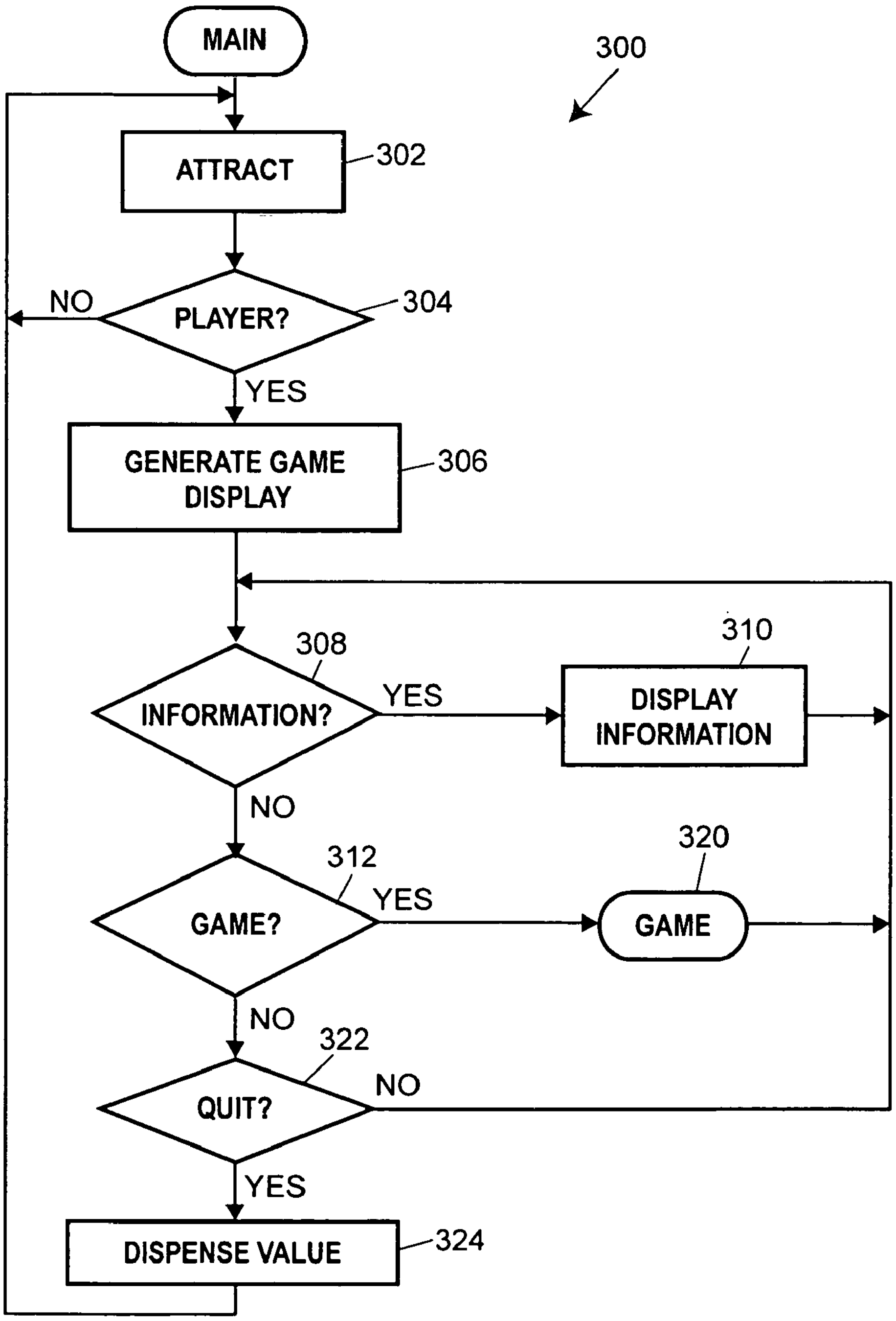
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 6:
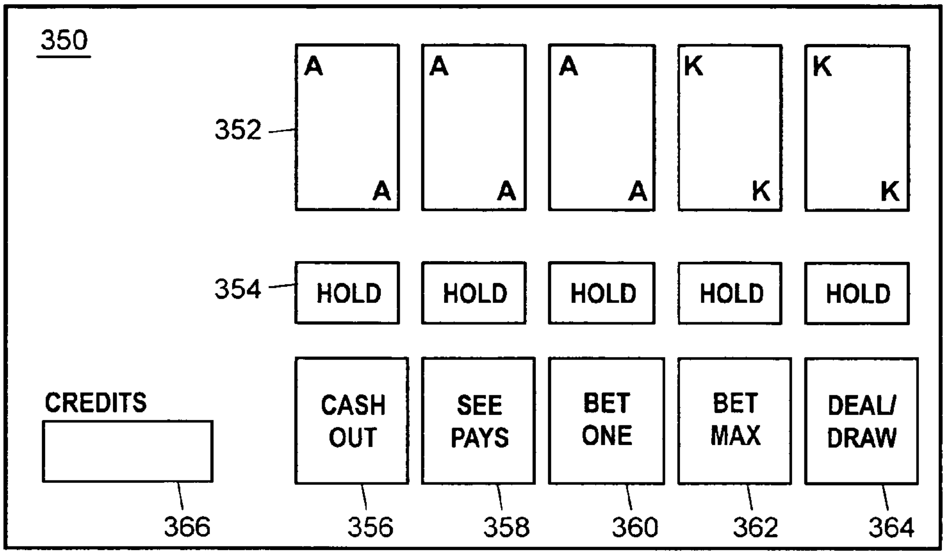
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
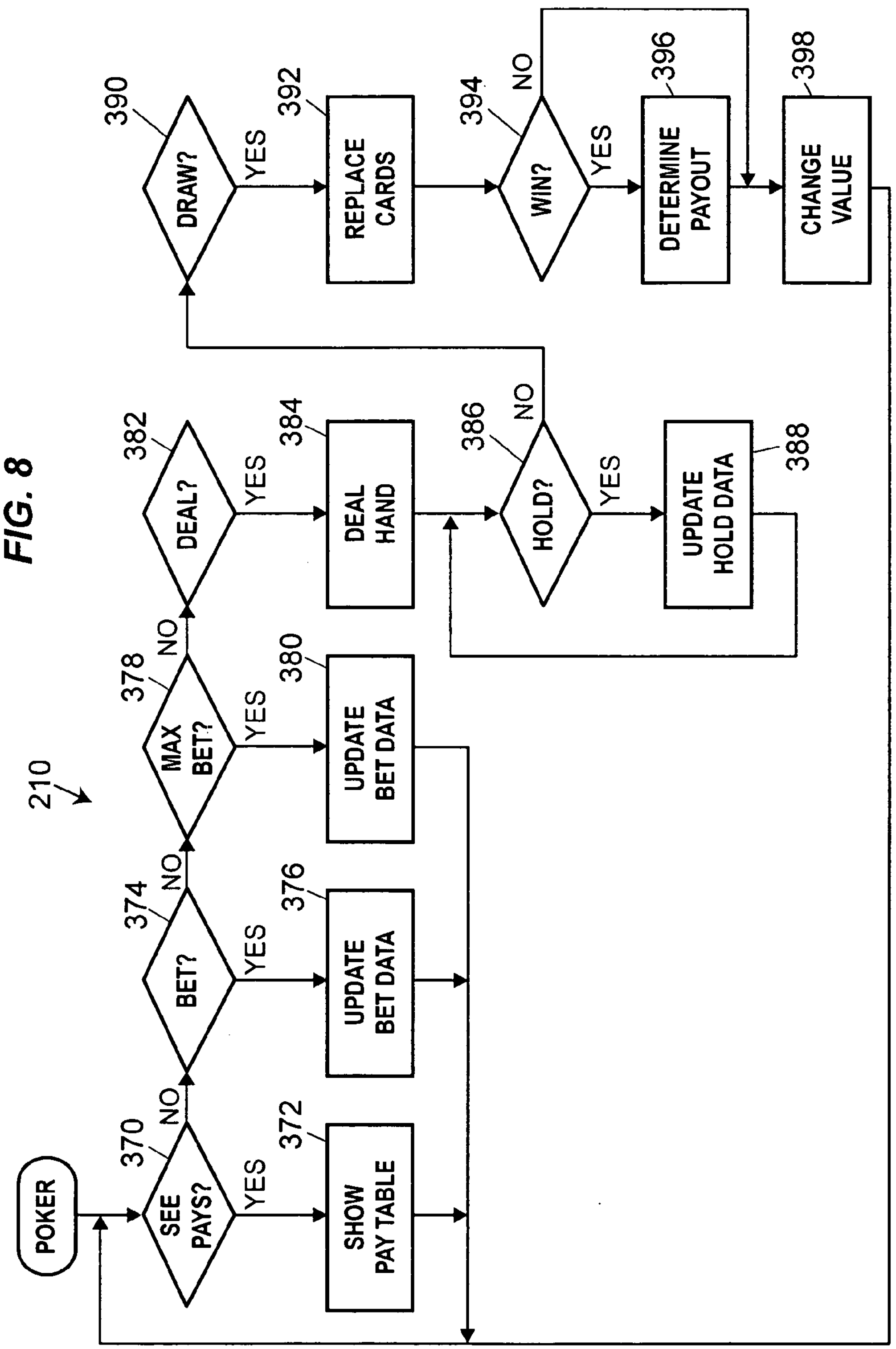
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
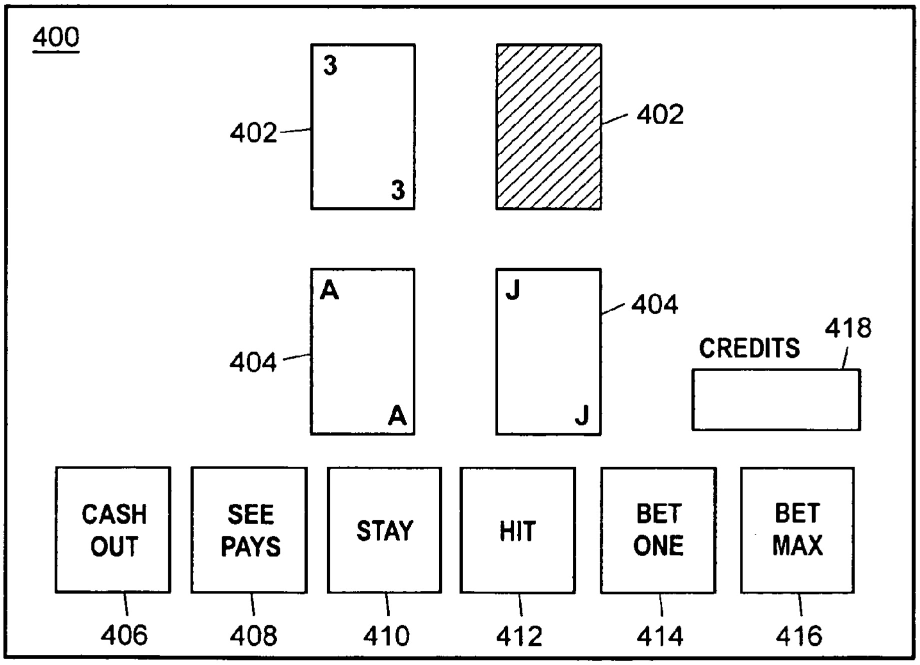
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414,

416 may form part of the video display 400. Alternatively, one or more of those buttons may be provided as part of a control panel that is provided separately from the display unit 70.

Figure 9:
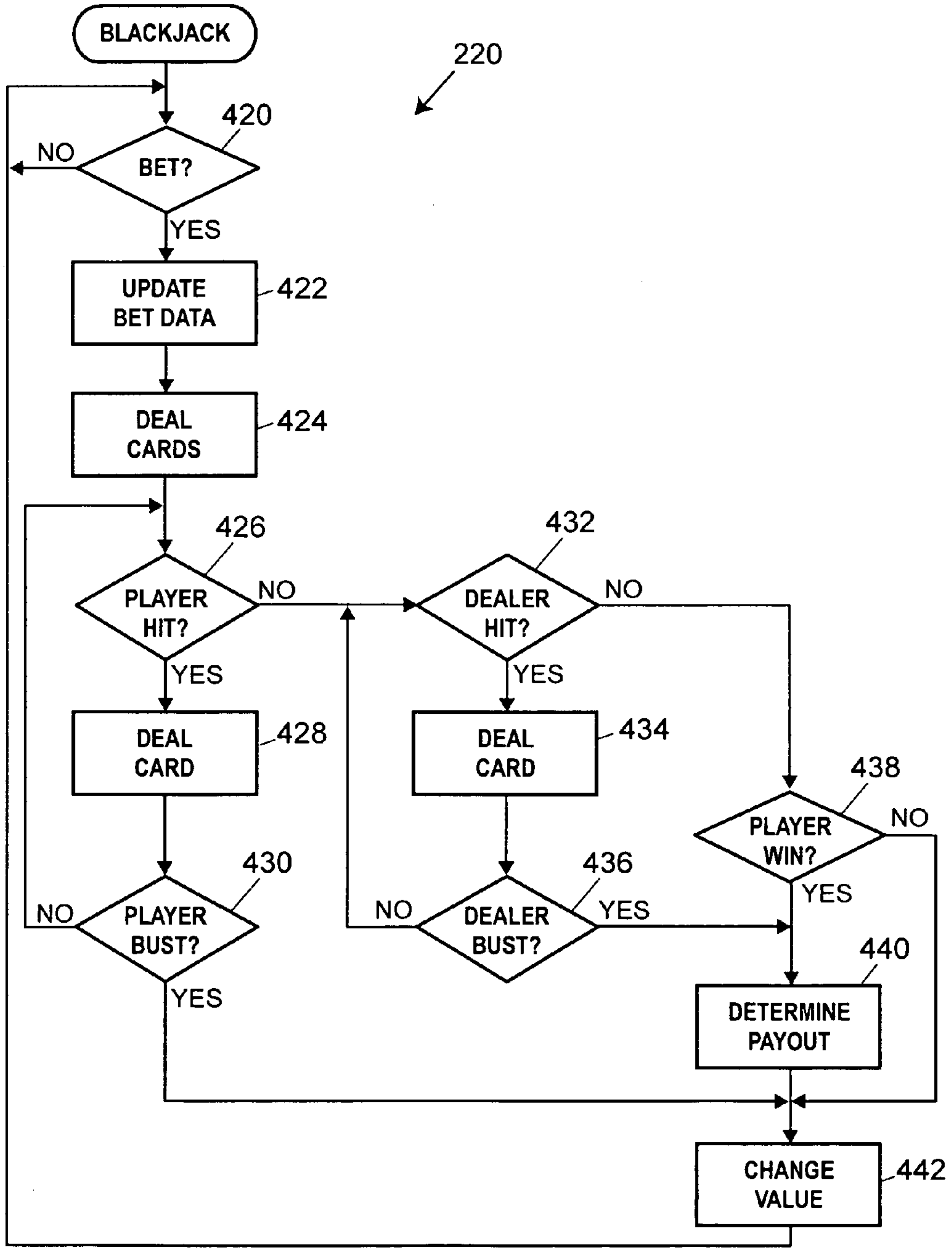
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 396. The cumulative value or number of credits may also be displayed in the display area 418 (FIG. 7).

Slots

Figure 10:
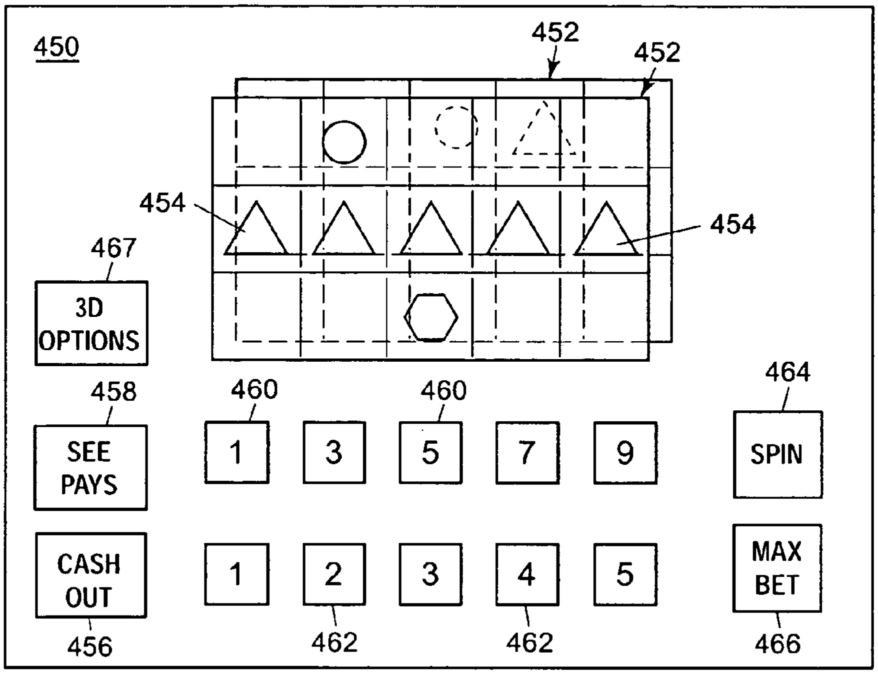
FIG. 10 is an illustration of an embodiment of a visual display that may be displayed during performance of the slots routine of FIG. 12.

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows ten reel images 452 on two geometric planes, each of which may have three reel symbols 454 that are visible at a time, other reel configurations could be utilized. In particular, additional three-dimensional reel configurations may be used as described in detail below.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, a "Max Bet" button 466 to allow a player to make the maximum wager allowable, and a "3D Options" button 467

Figure 12:
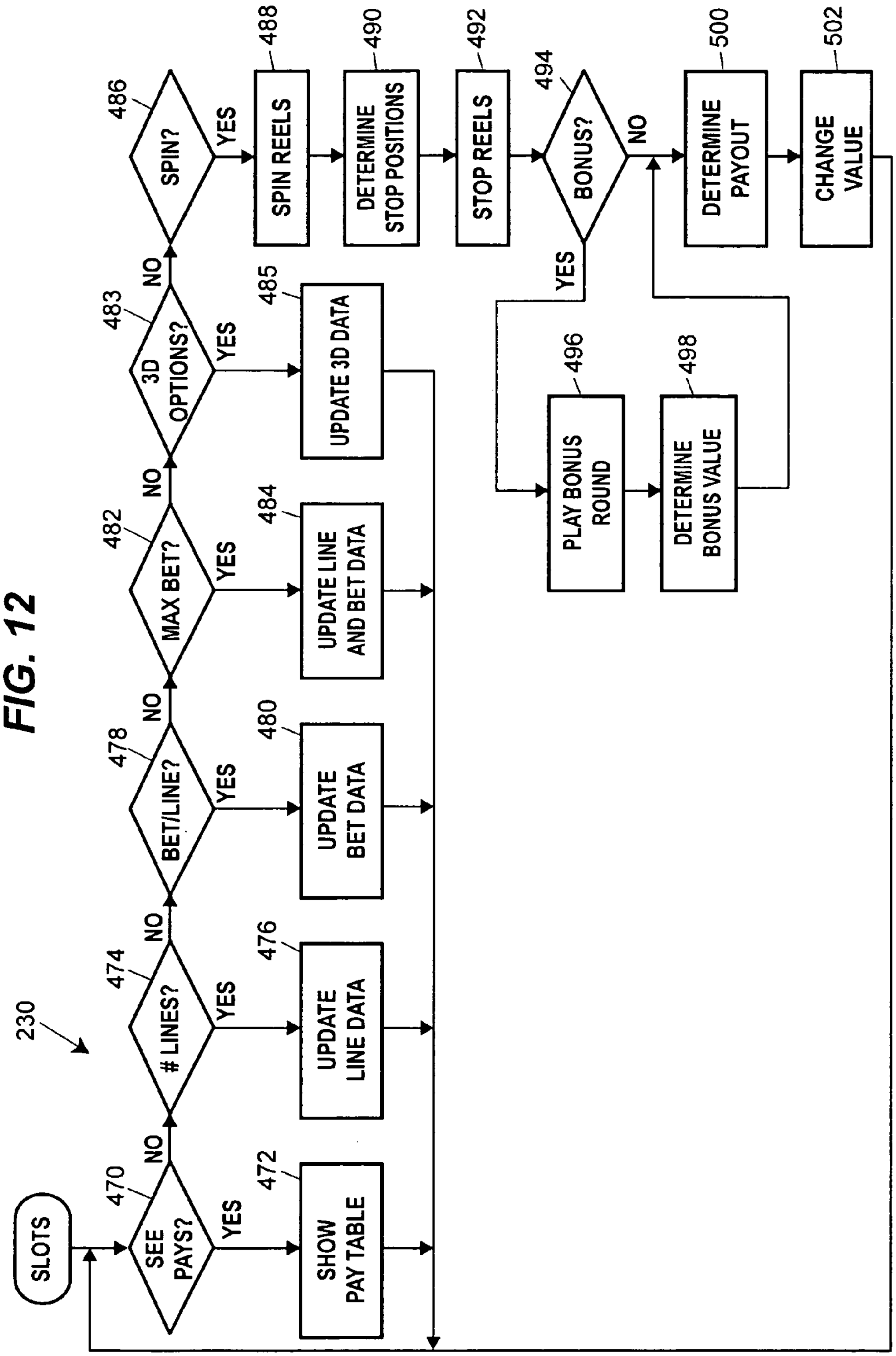
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100. At block 483, the routine may determine whether the player has pressed the "3D options" button 467, in which case at block 485 the routine may cause 3D data to be stored in the memory of the controller 100. As discussed below, selection of the "3D options" button 467 may allow further player interaction for selecting three-dimensional options such as how many play layers to include in the game, which three-dimensional positions are "staked," which game evaluation methods to use, and/or which three-dimensional display modes to use.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. The payout value may depend on three-dimensional game options as described in detail below. At block 502, the player's cumulative value or number of credits may be updated by subtracting the bet made by the player and adding, if the slot game and/or bonus round was a winner, the payout value determined at block 500.

Video Keno

Figure 11:
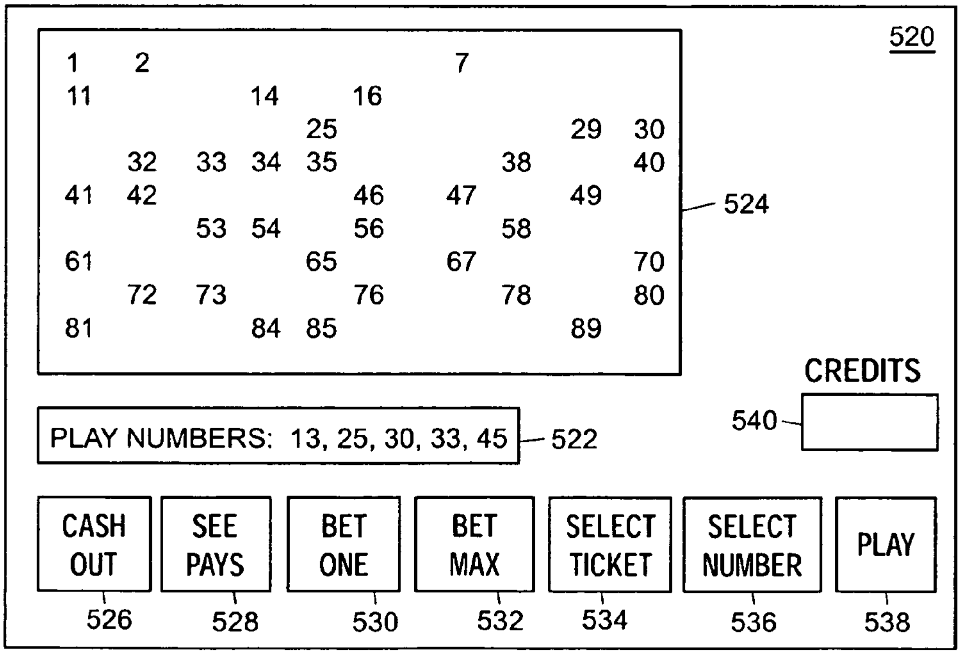
FIG. 11 is an illustration of an embodiment of a visual display that may be displayed during performance of the video keno routine of FIG. 13.

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
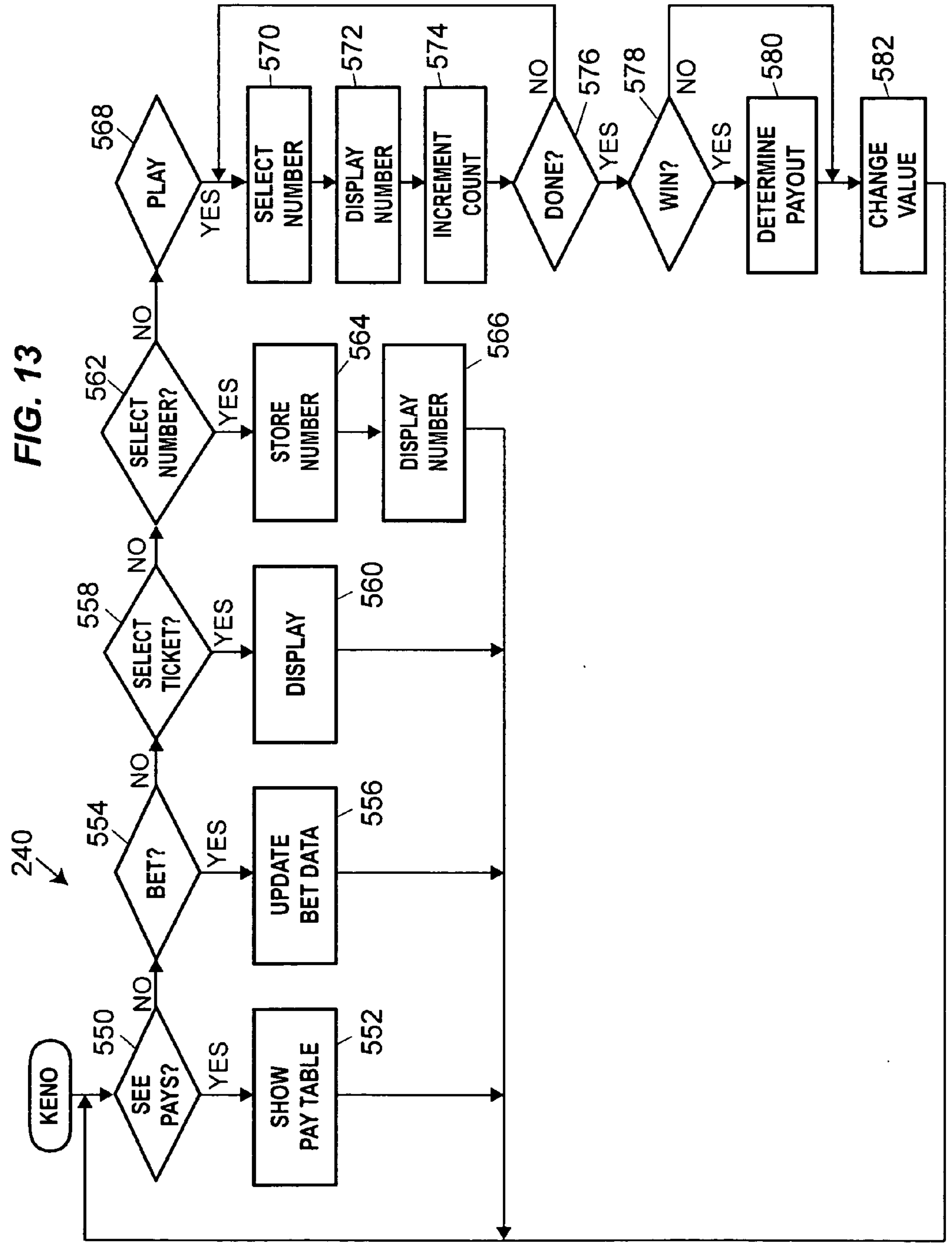
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
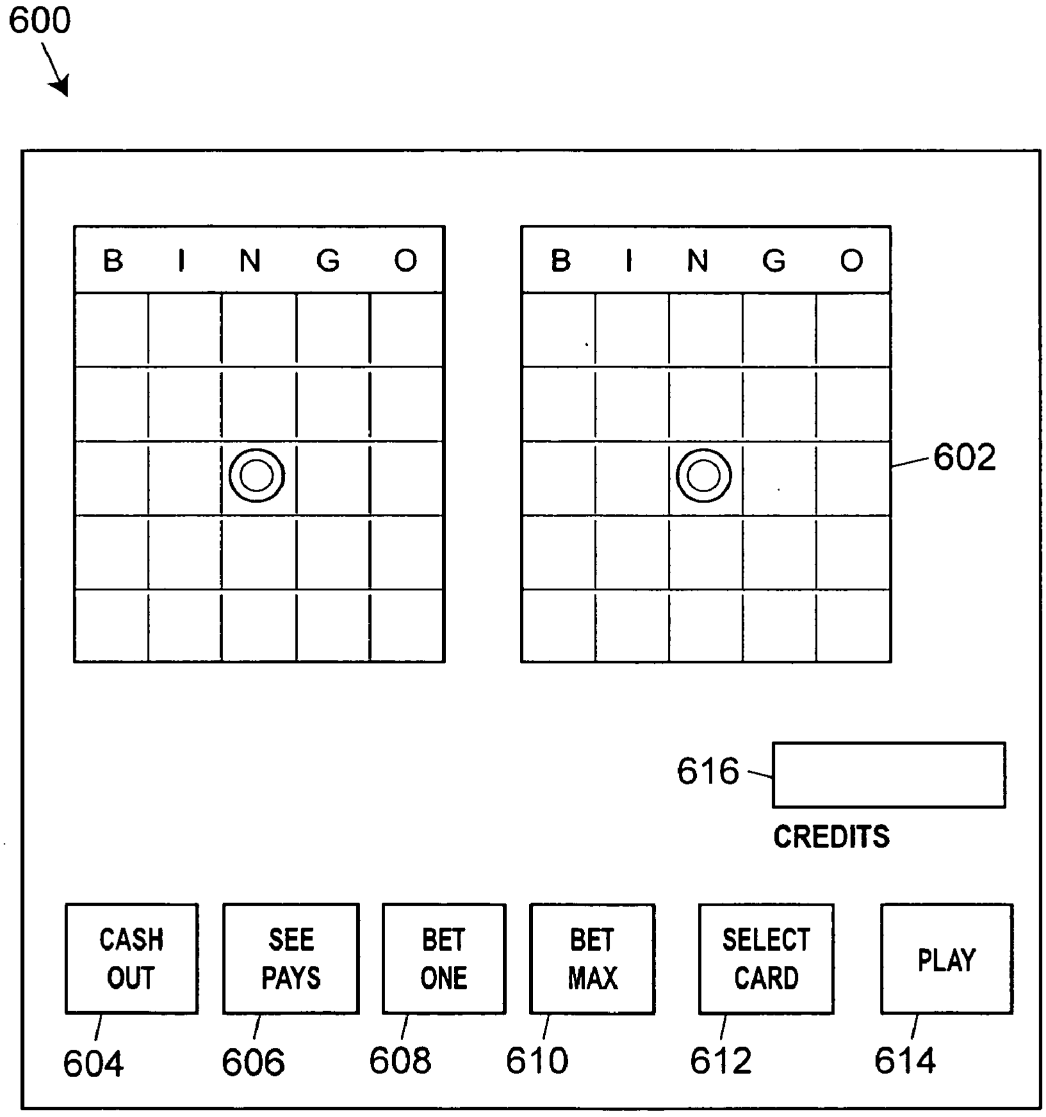
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
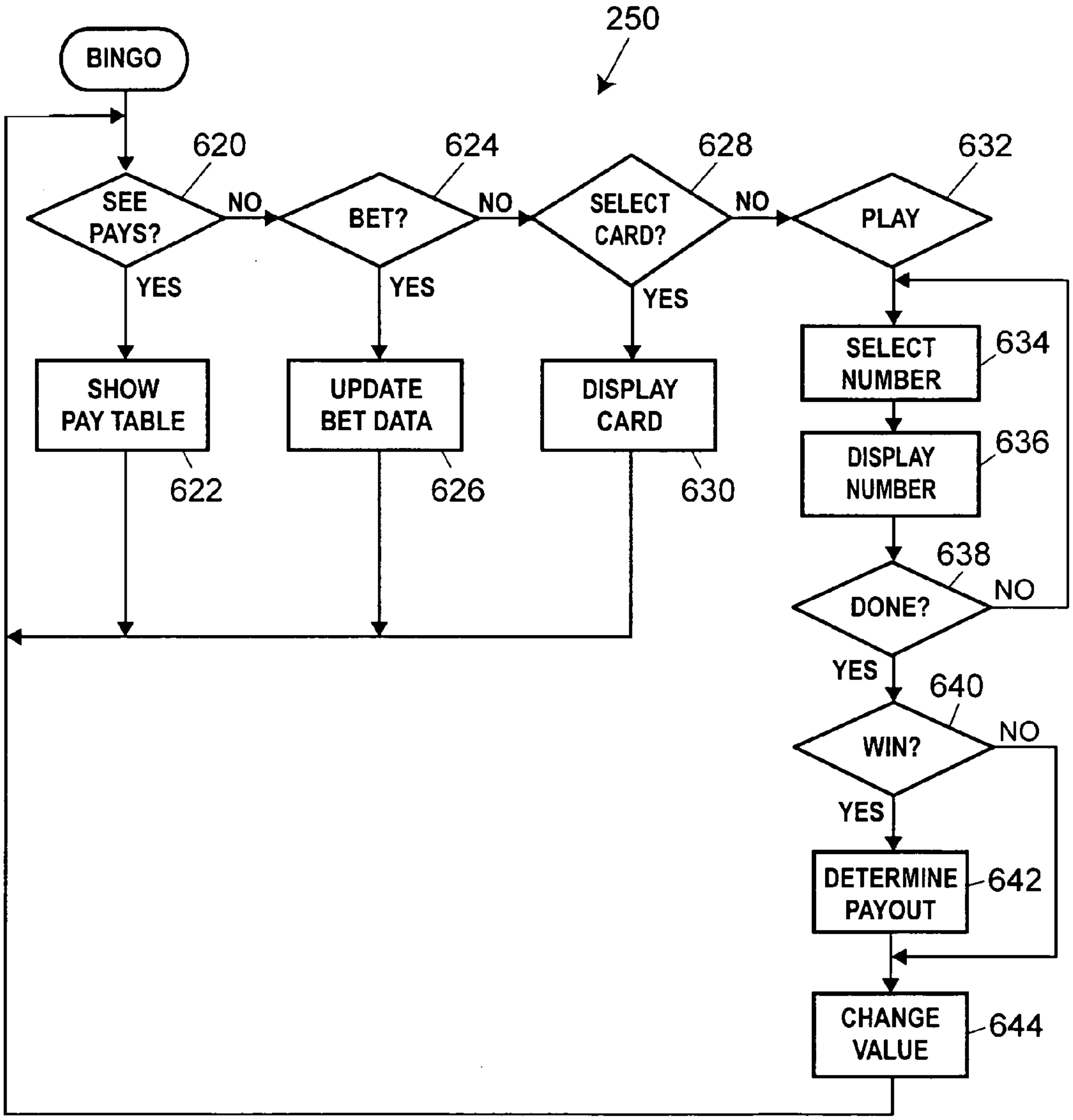
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Three-Dimensional Gaming

Figure 16:
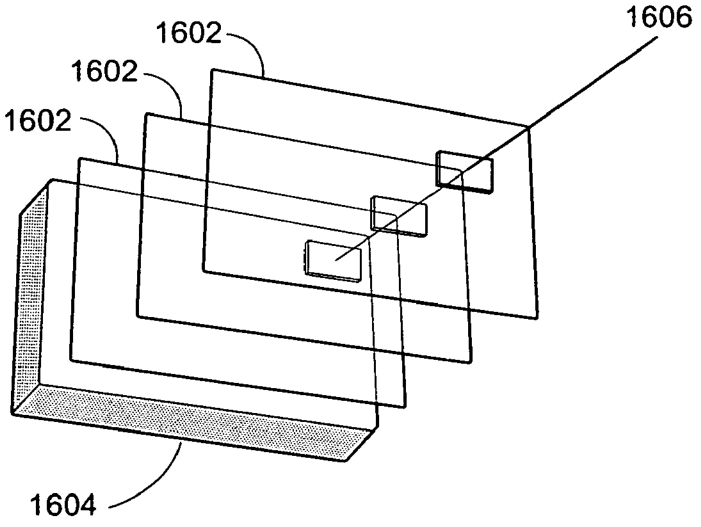
FIG. 16 is a symbolic diagram illustrating an exemplary three-dimensional play mode displaying a three of a kind win completely in the "Z" dimension.

Some gaming units may allow a player to select one or more game options. As shown in FIG. 16, these game options may include three-dimensional options such as how many "Z" layers 1602 to include in the game in addition to the "base layer" 1604. A "base layer" 1604 is a game surface depicted on a video display in a well known manner. For example, a typical video slot machine depicts a single game surface which includes five reels with three symbols showing on each reel. A "Z" layer 1602 is an additional game surface depicted on a video display in a way that makes at least a portion of the additional game surface appear on a different plane from the plane of the base layer 1604. For example, in a video slot machine, the player may select four layers of reels (i.e. one base layer 1604 and three "Z" layers 1602). In this manner, a pay line 1606 may be formed in the third dimension. Although a video slot machine is used in this description, a person of ordinary skill in the art will readily appreciate that any casino game may include three-dimensional options as described herein.

Figure 17:
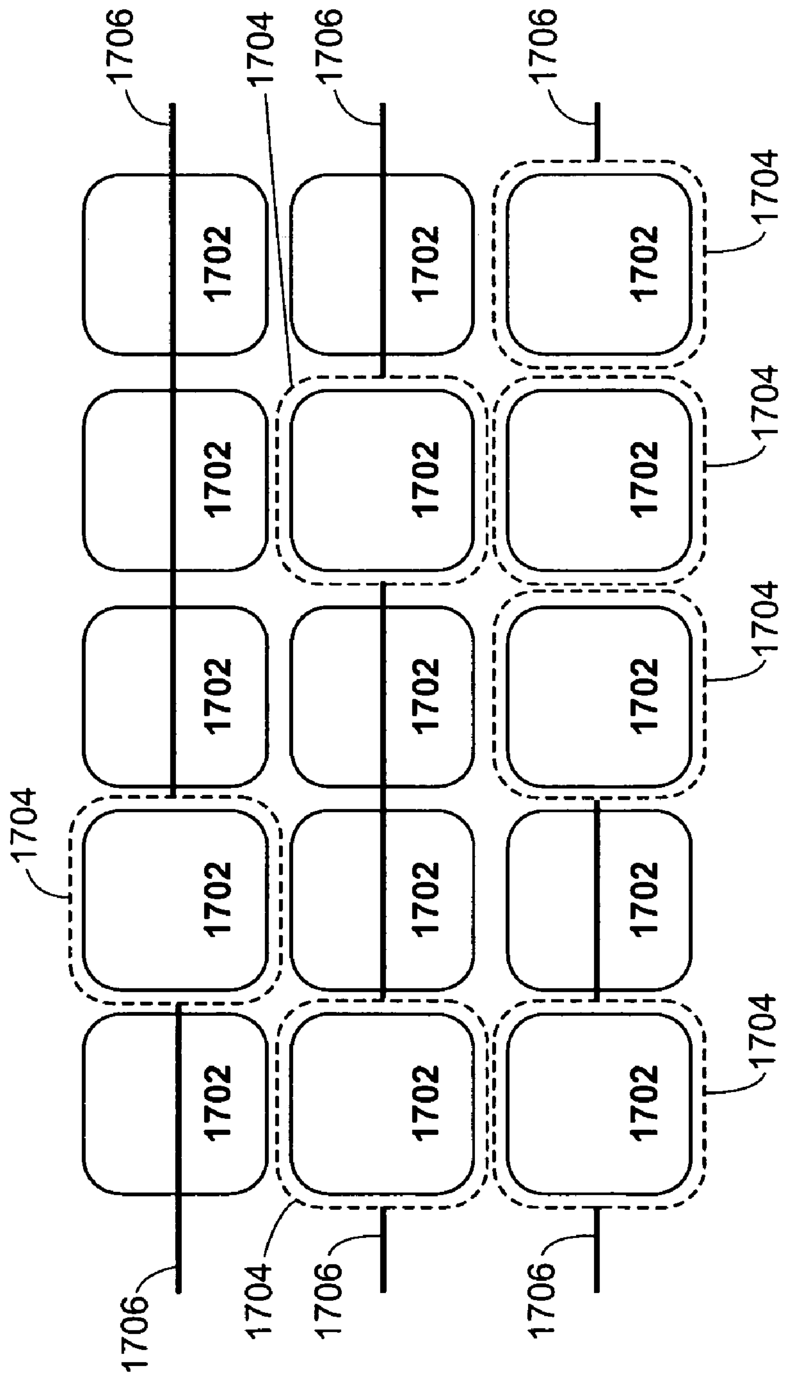
FIG. 17 is a symbolic diagram illustrating an exemplary three-dimensional play mode where a player customizes game play by covering one or more reel positions with transparent selectors by dragging the selectors from the side of the game display.

Player selectable game options may also include which three-dimensional reel positions are "staked" (i.e., which reel positions the player would like to wager money on). For example, in a video slot machine, the player may place a transparent stake indicator over one or more reel positions. FIG. 17 is a symbolic diagram illustrating an exemplary three-dimensional play mode where a player may customize game play by covering one or more reel positions 1702 with transparent selectors 1704. Using these selectors 1704, a player may choose to play only selected reel positions 1702 in the third dimension. The player may move the selectors 1704 using a touch screen device or any other user input device. The selectors 1704 may be moved to any reel position 1702. Multiple selectors 1704 may be placed on a single reel, and/or multiple reel positions may be covered by a single selector. A selector 1704 may be positioned by dragging the selector 1704 along a positioning bar 1706. Selectors 1704 may be positioned by dragging the selectors 1704 from the side of the game display, and/or selectors 1704 may be pulled down from the reel top and placed in any reel position 1702. Selectors 1704 may cover an entire reel, and/or selectors 1704 may be individually placed. In addition, one or more selectors 1704 may dynamically "chase" a certain symbol according to player selected options.

The player selected game options may determine one or more game evaluation methods and display modes. For example, the player may choose whether "Z" layer reels are to be played separate from other layers, linearly combined with other layers, non-linearly combined with other layers, only used for free game opportunities, only used for bonus multipliers, only used for progressives, etc. After one or more random numbers are generated, the outcome of the game is displayed three-dimensionally to the player based on the selected game evaluation methods and display modes. Many different game evaluation methods (described in detail below) are possible with the addition of "Z" layers.

Figure 18:
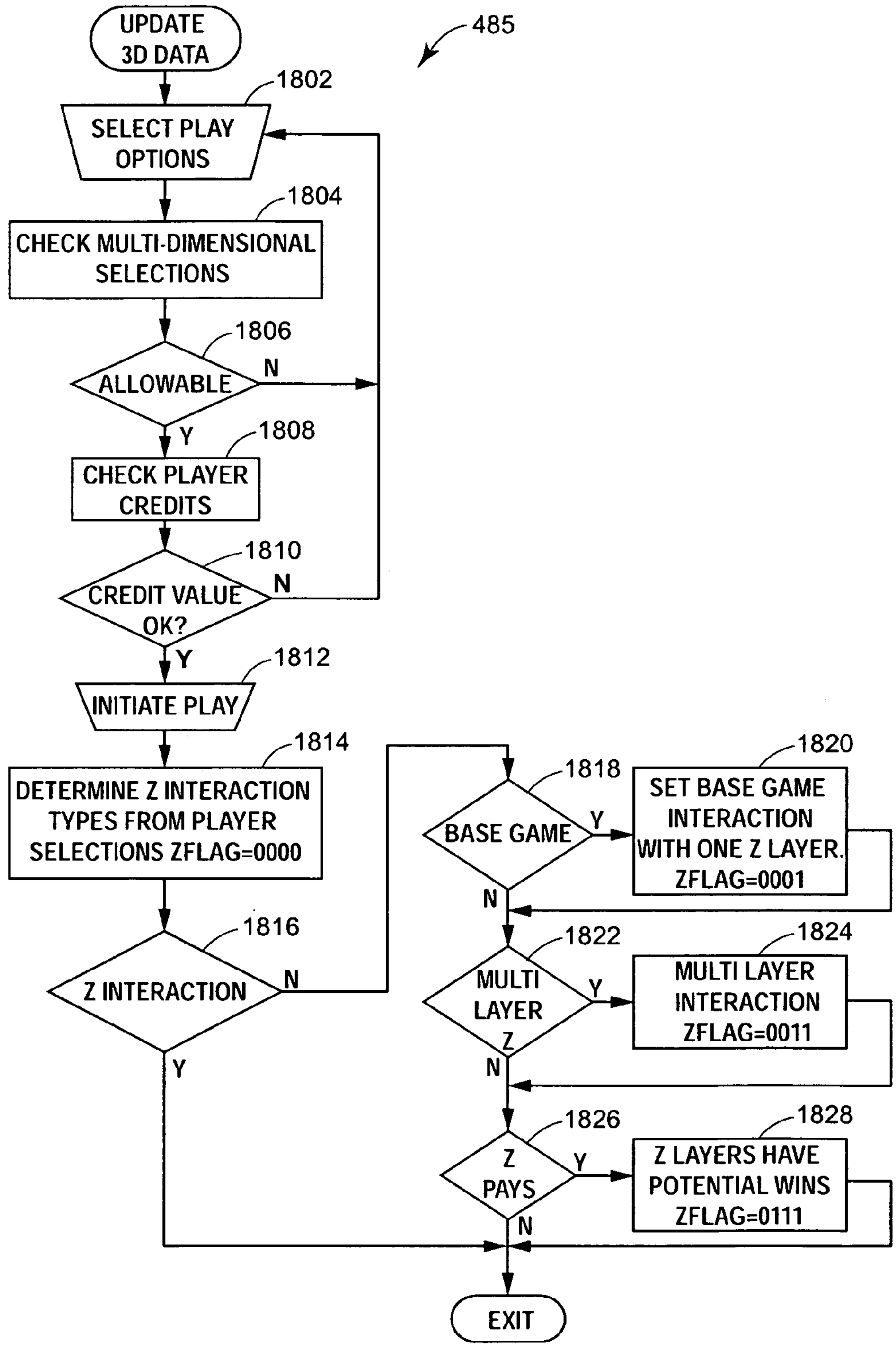
FIG. 18 is a more detailed flowchart of the "update 3D data" routine of FIG. 12.

FIG. 18 is a more detailed flowchart of the "update 3D data" routine 485 shown schematically in FIG. 12. The routine 485 may be embodied in a software program which is stored in the program memory 102 of a gaming unit 20 and executed by the microprocessor 104 in a well known manner. However, some or all of the blocks of the routine 485 may be performed manually and/or by another device. Although the routine 485 is described with reference to the flowchart illustrated in FIG. 18, a person of ordinary skill in the art will readily appreciate that many other methods of performing the acts associated with routine 485 may be used. For example, the order of many of the blocks may be changed without departing from the scope or spirit of the present invention. In addition, many of the blocks described are optional. Although this description focuses on a video slot machine, a person of ordinary skill in the art will readily appreciate that the teachings described herein may be applied to any type of gaming unit 20 without departing form the scope and spirit of the present invention.

Generally, the routine 485 causes the gaming unit 20 to allow a player to select one or more game options. These game options include three-dimensional options such as how many "Z" layers to include in the game in addition to the "base layer" and which reel positions are "staked." A "base layer" is a game surface depicted on a video display in a well known manner. For example, a typical video slot machine depicts a single game surface which includes five reels. A "Z" layer is an additional game surface depicted on a video display in a way that makes the additional game surface appear on a different plane from the plane of the base layer. The player's selections determine one or more game evaluation methods and display modes. For example, the player may choose to put money on a particular pay line which includes one or more "Z" layers (i.e., the player may "stake" a three-dimensional pay line). After one or more random numbers are generated, the outcome of the game is displayed to the player based on the selected game evaluation methods and display modes. Many different game evaluation methods (described in detail below) are possible with the addition of"Z" layers.

The routine 485 begins when the player selects one or more play options (block 1802). For example, the player may select a number of play layers. Play layers include the base layer and any "Z" layers. For example, by selecting one play layer, the player is indicating he wishes to play a typical (e.g., 5×3) reel layout (i.e., just the base layer). By selecting two play layers, the player is indicating that he would like to play with one "base" layer and one "Z" layer. Similarly, by selecting three play layers, the player is indicating that he would like to play with one "base" layer and two "Z" layers. In addition, the player may choose various three-dimensional payout options. For example, the player may choose whether "Z" layer reels are to be played separate from other layers, linearly combined with other layers, non-linearly combined with other layers, only used for free game opportunities, only used for bonus multipliers, only used for progressives, etc. These three-dimensional payout options are described in detail below.

After the player selects one or more play options, the video slot machine controller 100 checks any three-dimensional selections for allowability (block 1804). For example, at a one dollar slot machine with three play layers selected, the option to play each layer separately selected, and the option to linearly combine the three play layers selected, the player may be required to have at least four dollars in the machine. If the three-dimensional selections are allowable (block 1806), the controller 100 checks if the player has enough credits wagered to play the selected options (block 1808). In the example above, the player must wager four dollars. If the player has enough credits wagered (block 1810), the controller 100 waits for an input from the player to initiate play (block 1812). For example, the player may pull a traditional slot machine lever or push a button to initiate play.

Subsequently, the slot machine controller 100 determines the "Z" interaction types from the player selections. In this embodiment, the controller begins this sub-process by initializing a "Z" variable (e.g., Zflag=0000) (block 1814). Next, the controller 100 may determine if any "Z" layer options were selected by the player (block 1816). If at least one "Z" layer option was selected by the player, the controller 100 determines if the player selected an option which includes interaction between the base layer and one or more "Z" layers (block 1818). For example, the player may choose to play three completely independent layers with no interaction between the single base layer and the two "Z" layers. Alternatively, the player may select an option which includes pay lines that cross through different play layers (e.g., three of a kind with one matching symbol in each layer).

If the player selected an option which includes interaction between the base layer and one or more "Z" layers, the controller 100 may modify the "Z" variable accordingly (e.g., Zflag-0001) (block 1820). Similarly, if the player selected base layer interaction with more than one "Z" layer (block 1822), the controller may modify the "Z" variable to reflect this player selection (e.g., Zflag=0011) (block 1824). If the player also selected "Z" layer payouts (i.e., wins are possible from layer interaction) (block 1826), the controller may further modify the "Z" variable accordingly (e.g., Zflag=0111) (block 1828). Subsequently, the routine 485 exits.

Figure 19:
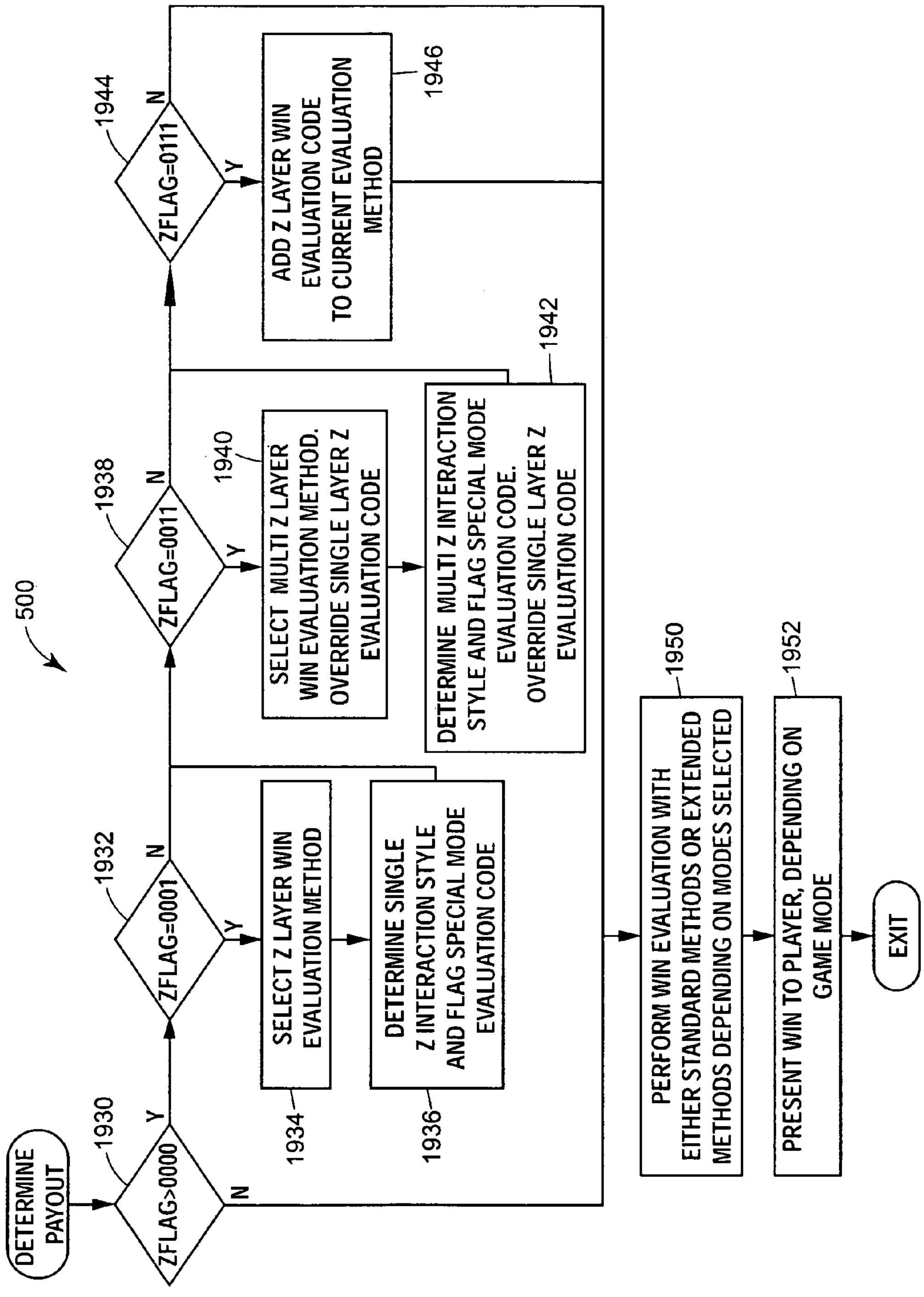
FIG. 19 is a more detailed flowchart of the "determined payout" routine of FIG. 12.

FIGS. 19 is a more detailed flowchart of the "determine payout" routine 500 shown schematically in FIG. 12. The routine 500 may be embodied in a software program which is stored in the program memory 102 of a gaming unit 20 and executed by the microprocessor 104 in a well known manner. However, some or all of the blocks of the routine 500 may be performed manually and/or by another device. Although the routine 500 is described with reference to the flowchart illustrated in FIG. 19, a person of ordinary skill in the art will readily appreciate that many other methods of performing the acts associated with routine 500 may be used. For example, the order of many of the blocks may be changed without departing from the scope or spirit of the present invention. In addition, many of the blocks described are optional. Although this description focuses on a video slot machine, a person of ordinary skill in the art will readily appreciate that the teachings described herein may be applied to any type of gaming unit 20 without departing form the scope and spirit of the present invention.

The routine 500 begins when the video slot machine controller 100 selects one or more "Z" layer win evaluation methods based on the state of the "Z" variable. If no "Z" layer interaction types are selected by the player (e.g., Zflag=0000) (block 1930), no "Z" layer win evaluation methods are used by the controller 100. If the player selected base layer interaction with at least one "Z" layer (e.g., Zflag=0001) (block 1932), the controller 100 selects a single "Z" layer win evaluation method (block 1934), determines a single "Z" interaction style (block 1936), and flags a special mode single layer "Z" evaluation code (block 1936). In this manner, an appropriate evaluation routine may be selected for single "Z" layer interaction. The flagged win evaluation routine may determine what symbol combinations form predefined wins and award the associated prize(s).

If the player selected base game interaction with more than one "Z" layer (e.g., Zflag0011) (block 1938), the controller 100 selects a multiple "Z" layer win evaluation method (block 1940), determines a multiple "Z" interaction style (block 1942), flags a special mode multiple layer "Z" evaluation code (block 1942), and overrides the single layer "Z" evaluation code (block 1942). In this manner, an appropriate evaluation routine may be selected for multiple "Z" layer interaction. The flagged win evaluation routine may determine what symbol combinations form predefined wins and award the associated prize(s). If the player also selected "Z" layer payouts (e.g., Zflag=0111) (block 1944), the controller adds a "Z" layer win evaluation code to the current evaluation method (block 1946).

Next, the controller 100 performs a win evaluation using either standard methods (i.e., one dimension) or extended methods (i.e., three dimensions) depending on the modes selected by the player (block 1950). The game must always have a payout which is statistically provable and within predetermined limits (e.g., 90% return to player). Therefore, if player selections change the structure of the game, certain variables within the game must also change to keep the payout substantially constant.

Specifically, depending on the "Z" interaction, the game style and the game mode, the win evaluation process may select certain pay tables, reel strip layouts, and/or game rules from a plurality of preprogrammed pay tables, reel strip layouts, and/or game rules. Pay tables contain the credit values that can be won for a particular symbol combination. An exemplary pay table 2000 is illustrated in FIG. 20. Reel strip layouts determine game operation by defining the symbol combinations for the game. An exemplary reel strip layout 2100 is illustrated in FIG. 21. Letters 2102 and numbers 2104 in the reel strip layout 2100 represent various pictures and symbols which characterize the game. In this example, the "Z" symbol 2106 appears twice in the first reel, twice in the second reel, once in the third reel, once in the fourth reel, and once on the fifth reel. Of course, any number and combination of symbols may be used to control the overall return percentage of the game. The "Z" symbol 2106 may represent a free game, a bonus, an interaction with other layers, etc.). In addition, a person of ordinary skill in the art will readily appreciate that the reel strip layout 2100 may be linked to special modifier tables that have algorithmic rules attached. The pay table(s), 2000 reel strip layout(s) 2100, and game rule(s) determine the games overall percentages return structure.

Many modifications to the pay table(s) 2000, reel strip layout(s) 2100, and game rule(s) which affect the overall percentages return structure of a game are well known. By adding a "Z" dimension, additional modifications to the pay table(s) 2000, reel strip layout(s) 2100, and game rule(s) which affect the overall percentages return structure of a game are provided. For example, each play layer may be evaluated separately using traditional methods, and then the individual results may be combined. In this embodiment, transparent overlays or "symbol within symbol" graphics may be used to present the layers to the player.

Figure 22:
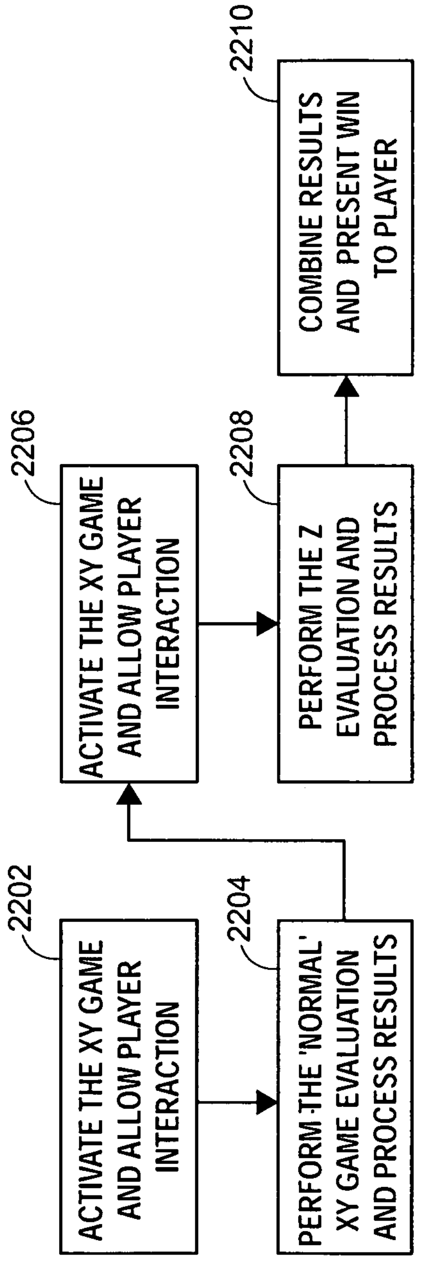
FIG. 22 is a flowchart of an embodiment of an individual layer win valuation routine that may be performed by one or more of the gaming units.

A flowchart illustrating one embodiment of this individual layer evaluation method 2200 is illustrated in FIG. 22. First, the controller 100 activates the base layer XY game and allows player interaction (block 2202). For example, the player may change the number of pay lines, the number of credits to bet, or activate a layer via a user input device. The controller 100 then performs "normal" XY game evaluations and processes the results (block 2204). For example, three of a kind (in this layer) might pay one hundred credits. Next, the controller 100 activates the "Z" layer XY game and allows player interaction (block 2206). The controller 100 then performs additional "Z" evaluations and processes the results (block 2208). For example, "Z" layer symbols may be combined with base layer symbols to create a pay line which crosses between the two layers Of course, a person of ordinary skill in the art will readily appreciate that more than two layers may be evaluated in this manner. The results of the individual determinations are then combined into one win statement which is presented to the player (block 2210). For example, if the player won one hundred credits from the base layer and one thousand credits from the "Z" layer the player may be informed that he won eleven hundred credits.

Figure 23:
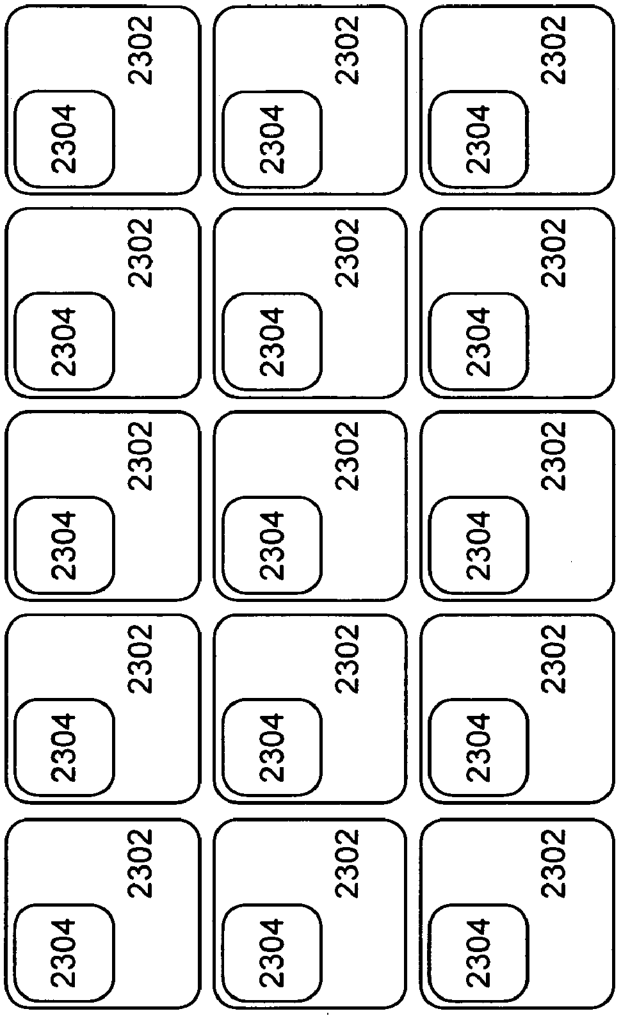
FIG. 23 is a symbolic diagram illustrating an exemplary three-dimensional play mode where a traditional 5×3 reel layout is extended to 10×3 layout by adding one "Z" layer.

In another multi-layer win evaluation method, one or more "Z" layers may extend a base layer as illustrated in FIG. 23. In this example, traditional 5×3 base layer symbols 2302 are extended to a 10×3 reel layout by adding "Z" layer symbols 2304. As a result, new win evaluation methods such as six of a kind, seven of a kind, eight of a kind, nine of a kind, and ten of kind are possible. Of course, a person of ordinary skill in the art will readily appreciate that any number of layers and n-kind extensions are possible. As a result, extremely large prizes are possible for players wishing to gamble at higher levels. In this embodiment, both layers may be viewed simultaneously by overlaying "Z" layer symbols 2304 inside of base layer symbols 2302. Specifically, a portion of a base layer symbol 2302 may be obstructed by a relatively smaller version of a "Z" layer symbol 2304. Optionally, the overlayed "Z" layer symbols 2304 may be semi-transparent.

Figure 24:
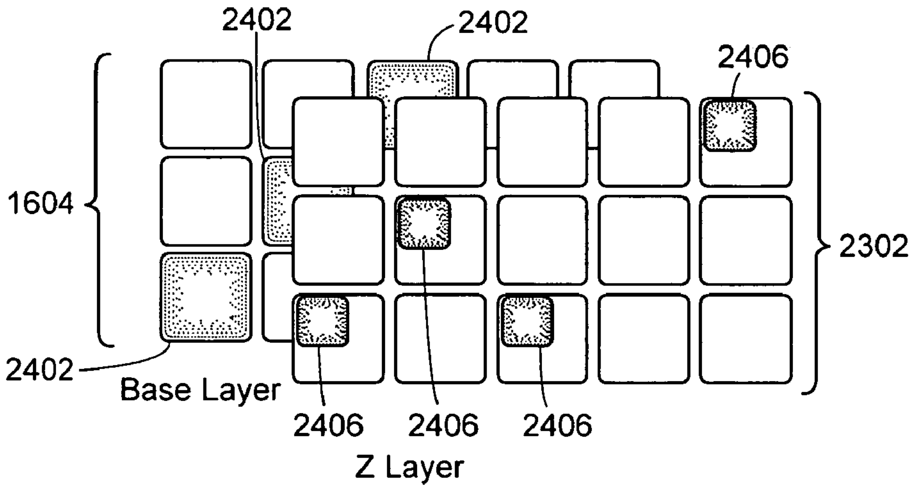
FIG. 24 is a symbolic diagram illustrating an exemplary three-dimensional play mode displaying a three of a kind scatter win on the base layer with four additional scatters on the "Z" layer.

In yet another multi-layer win evaluation method, one or more "Z" layers may interact with the base layer For example, if a five of a kind win occurs on the base layer, one additional occurrence of the same symbol on the "Z" layer may be used to multiply the five of a kind payout by two. Two additional occurrences may multiply the five of a kind payout by three. Three additional occurrences may multiply the five of a kind payout by four. Four additional occurrences may multiply the five of a kind payout by five. Five additional occurrences may multiply the five of a kind payout by six. In the same embodiment, one additional occurrence of the same symbol on the "Z" layer may be used to turn a four of a kind win on the base layer into a five of a kind win. Two additional occurrences may be used to turn a four of a kind win on the base layer into a five of a kind win and multiply the five of a kind win by two. A person of ordinary skill in the art will readily appreciate that this scheme may be easily extended to additional combinations of base layer wins and "Z" add-ons. For example, as shown in FIG. 24, a three of a kind scatter win 2402 on the base layer 1604 with four additional scatters symbols 2406 on the "Z" layer 2302 may result in a five of a kind win multiplied by three.

Figure 25:
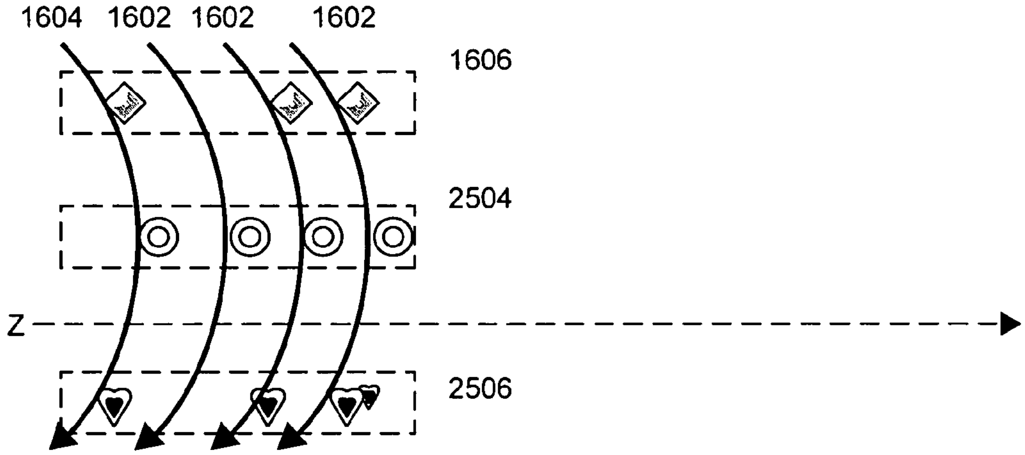
FIG. 25 is a symbolic diagram illustrating an exemplary three-dimensional play mode including additional win evaluation methods.

A symbolic representation of additional "Z" layer win evaluation methods is illustrated in FIG. 25. In this example, three "Z" layer win evaluation methods are shown. A three of a kind win 1602 in the "Z" dimension is shown. In some embodiments, this type of three of a kind win 2502 may require a "special modifier symbol." A special modifier symbol is a symbol which transforms one or more underlying symbols into substitute symbols and/or scatter symbols. A four of a kind win 2504 in the "Z" dimension, and a two of a kind win 2506 in the "Z" dimension are also shown in FIG. 25.

In addition, a person of ordinary skill in the art will readily appreciate that many other multi-layer win evaluation methods are possible within the scope and spirit of the present invention. For example, a "Z" overlayed symbol matching a base layer symbol may provide a free game and/or some other prize. One or more "Z" overlayed symbols forming a pay line with one or more base layer symbols may provide a free game and/or some other prize. One or more "Z" overlayed symbols which are substitutes for one or more base layer symbols may provide a free game and/or some other prize. Substitute symbols "stand in" for other symbols according to predefined game rules. For example, a "wild card" symbol may be substituted for any "cherry" symbol. A "Z" overlayed symbol above a special (e.g., animated) base layer symbol may provide a free game and/or some other prize.

Still further, extended progressive win evaluation methods are possible within the scope and spirit of the present invention. For example, a "Z" overlayed symbol matching a base layer symbol may indicate a progressive win. A "Z" overlayed symbol may indicate a chance at a progressive win, while the base layer provides the win/loss. The base layer may provide a progressive win, and the "Z" layer may indicate a win multiplier or a progressive game level.

When a plurality of "Z" levels are presented, additional win evaluation methods are possible within the scope and spirit of the present invention. For example, a three of a kind win 1606 completely in the "Z" dimension is possible (see FIG. 16). Of course, any number of n-kind wins (e.g., four of a kind, five of a kind, etc.) may be extended in the "Z" dimension. In one embodiment, symbols from different layers may be threaded together to form pay lines.

Returning to FIG. 19, once the win evaluation is performed, the controller 100 graphically presents the win/loss to the player (block 1952). Depending on the game mode, the graphical display may take on a variety of forms. For example, credits won on each layer and total credits may be displayed separately. Of course, a person of ordinary skill in the art will readily appreciate that many different ways of displaying the win/loss to the player may be used without departing from the scope or spirit of the present invention. Subsequently, the routine 500 exits.

In summary, persons of ordinary skill in the art will readily appreciate that methods and apparatus for three-dimensional gaming has been provided. Gaming systems implementing the teachings described herein may benefit from new game types, new display modes, and new win evaluation methods which increase player options and interest.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gaming apparatus, comprising:

a display unit that is capable of generating video images;

a user input device;

a value input device; and a controller operatively coupled to said display unit, said user input device, and said value input device, said controller comprising a processor and a memory operatively coupled to said processor, said controller being programmed to cause a three-dimensional video image of a casino game to be generated on said display unit, said three-dimensional video image including a plurality of layers, each layer depicting a game surface such that the game surface appears to be on a different plane than the game surfaces of other layers, each game surface including a plurality of game indicia;

said controller being programmed to receive a player selected game option from said user input device, the player selected game option being indicative of only one of a first win evaluation method or a second win evaluation method, wherein the first win evaluation method is different than the second win evaluation method, and wherein the first win evaluation method is a three-dimensional win evaluation method associated with game indicia of game surfaces of different layers and the second win evaluation method is a two-dimensional win evaluation method associated with game indicia of a game surface of one of the plurality of game layers, the player selected game option including a selection of any one of the plurality of layers on which the second win evaluation method is to be performed if the second win evaluation method is selected;

said controller being programmed to allow a person to make a wager, said controller being programmed to perform the first win evaluation method to determine a value payout associated with an outcome of said casino game if the player selected game option is indicative of the first win evaluation method; and said controller being programmed to perform the second win evaluation method to determine a value payout associated with an outcome of said casino game in the any one of the plurality of layers selected if the player selected game option is indicative of the second win evaluation method.

2. A gaming apparatus as defined in claim 1 wherein said controller is programmed to select a pay table from a plurality of pay tables based on said player selected game option.

3. A gaming apparatus as defined in claim 1 wherein said controller is programmed to select a reel strip layout from a plurality of reel strip layouts based on said player selected game option.

4. A gaming apparatus as defined in claim 1 wherein said controller is programmed to generate a transparent overlay on the display unit, the transparent overlay being indicative of the player selected game option.

5. A gaming apparatus as defined in claim 1 wherein said controller is programmed to generate a first video slot machine symbol within a second video slot machine symbol on the display unit.

6. A gaming apparatus as defined in claim 1 wherein said first win evaluation method comprises combining a plurality of individual layer evaluations.

7. A gaming apparatus as defined in claim 1 wherein said first win evaluation method comprises an n-kind extension method.

8. A gaming apparatus as defined in claim 1 wherein said first win evaluation method comprises a "Z" layer interaction method.

9. A gaming apparatus as defined in claim 1 wherein said first win evaluation method comprises an extended progressive win evaluation method.

10. A gaming apparatus as defined in claim 1 wherein said controller is programmed to determine the outcome of said casino game based on a number of play layers selected by a player via the user input device.

11. A gaming apparatus as defined in claim 1 wherein said controller is programmed to check said player selected game option for allowability.

12. A gaming apparatus as defined in claim 1 wherein said controller is programmed to check for availability of sufficient credits for the player selected game option.

13. A gaming system comprising a plurality of gaming apparatuses as defined in claim 1, said gaming apparatuses being interconnected to form a network of gaming apparatuses.

14. A gaming apparatus as defined in claim 1 wherein said three-dimensional video image represents a game selected from the group of games consisting of video poker, video blackjack, video slots, video keno and video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, said video image comprising an image of a bingo grid if said game comprises video bingo.

15. A gaming apparatus as defined in claim 1, the player selected game option being indicative of a second win evaluation method and including a selection of one of the plurality of layers; said controller being programmed to receive another player selected game option from said user input device, the another player selected game option being indicative of a second win evaluation method and being associated with another of the plurality of layers.

16. A gaming apparatus as defined in claim 1, the player selected game option including a selection to play each of the plurality of layers separately from the other of the plurality of layers.

17. A gaming apparatus as defined in claim 1, the player selected game option including a selection to play each of the plurality of layers linearly combined with each other.

18. A gaming apparatus as defined in claim 1, the player selected game option including a selection to play each of the plurality of layers non-linearly combined with each other.

19. A gaming apparatus as defined in claim 1, the player selected game option including a selection to play one of the plurality of layers only for free game opportunities, only for bonus multipliers or only for progressive jackpots.

20. A gaming apparatus as defined in claim 1, the player selected game option including a selection to of how many layers to include in the plurality of layers.

21. A gaming apparatus as defined in claim 4 wherein the transparent overlay is positioned on the display unit via the user input device by dragging a graphical selector.

22. A gaming system as defined in claim 13, wherein said gaming apparatuses are interconnected via the Internet.

23. A gaming apparatus as defined in claim 15, the game indicia of the one of the plurality of layers and the another of the plurality of layers representing separate slots. games, the game indicia for each slots game being organized into reels and associated with a plurality of possible paylines, the player selected game option being associated with a payline in the one of the plurality of layers and the another player selected game option being associated with a payline in the another of the plurality of layers.

24. A gaming apparatus as defined in claim 15, said controller being programmed to receive a further player selected game option from said user input device, the further player selected game option being indicative of a first win evaluation method and being associated with at least one of the game indicia from the one of the plurality of layers and at least one of the game indicia from the another of the plurality of layers.

25. A gaming apparatus as defined in claim 21 wherein the graphical selector transparently covers a single video slot machine reel position.

26. A gaming apparatus as defined in claim 21 wherein the graphical selector transparently covers an entire video slot machine reel.

27. A gaming apparatus as defined in claim 24, wherein there are a corresponding number of reels displayed in the one and the another of the plurality of layers, and the at least one of the game indicia from the one of the plurality of layers and the at least one of the game indicia from the another of the plurality of layers are from the same reel in the one and the another of the plurality of layers.

28. A gaming apparatus as defined in claim 24, wherein there are a corresponding number of reels displayed in the one and the another of the plurality of layers, and the at least one of the game indicia from the one of the plurality of layers and the at least one of the game indicia from the another of the plurality of layers are from different reels in the one and the another of the plurality of layers.

* * * * *